United States Patent
Parak et al.

(10) Patent No.: US 10,189,498 B2
(45) Date of Patent: Jan. 29, 2019

(54) POWER STEERING TANK BAFFLE

(71) Applicant: Nissan North America, Inc., Franklin, TN (US)

(72) Inventors: Travis James Parak, Shelby Township, MI (US); Tok Lau, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 112 days.

(21) Appl. No.: 15/281,980

(22) Filed: Sep. 30, 2016

(65) Prior Publication Data

US 2018/0093704 A1 Apr. 5, 2018

(51) Int. Cl.
*B62D 5/06* (2006.01)
*F15B 21/04* (2006.01)
*B01D 35/027* (2006.01)

(52) U.S. Cl.
CPC ........... *B62D 5/062* (2013.01); *B01D 35/027* (2013.01); *F15B 21/041* (2013.01)

(58) Field of Classification Search
CPC ..... B62D 5/062; F15B 21/041; B01D 35/027; B01D 29/0006; B01D 2201/18; B01D 2201/184

USPC .................................................. 210/435, 451
See application file for complete search history.

(56) References Cited

U.S. PATENT DOCUMENTS

| | | | | |
|---|---|---|---|---|
| 4,964,983 A | * | 10/1990 | Abe | B01D 29/01 210/167.04 |
| 2005/0092375 A1 | * | 5/2005 | Kim | B60T 17/06 137/574 |
| 2015/0196859 A1 | * | 7/2015 | Levitt | B01D 29/23 210/767 |

FOREIGN PATENT DOCUMENTS

CN 102840186 A 12/2012

* cited by examiner

*Primary Examiner* — Claire A Norris
*Assistant Examiner* — Julia L. Wun
(74) *Attorney, Agent, or Firm* — Global IP Counselors, LLP

(57) ABSTRACT

A power steering tank baffle includes a filter member, a hood member and a rib member. The filter member includes an inflow portion and an outflow portion, the inflow portion including a first plurality of openings and a second plurality of openings. The hood member is disposed over the inflow portion. The rib member connects the filter member and the hood member, the rib member being disposed on the inflow portion so as to separate the first plurality of openings and the second plurality of openings.

22 Claims, 11 Drawing Sheets

POWER STEERING TANK BAFFLE

BACKGROUND

Field of the Invention

The present invention generally relates to a power steering tank baffle. More specifically, the present invention relates to a power steering tank baffle with improved power steering fluid flow control.

Background Information

Conventional vehicles include power steering baffles. Such baffles filter the power steering fluid prior to entering the power steering pump. Conventional baffles can have a diffuser with round holes, in such a configuration, fluid is pumped into the upper tank vertically. However, due to the rate of flow into the tank, or other circumstances, volatility of the fluid can occur. Conventional baffle designs attempt to reduce the volatility in the tank by having the fluid entering the tank contact a solid portion of the baffle. This configuration can redirect the fluid entering the tank to a circular hole pattern in the baffle adjacent the solid portion to enable the fluid to pass from one side of the baffle to the other.

SUMMARY

It has been discovered that due to the high flow rate of some vehicles a geyser of power steering fluid can be formed above the diffuser and cause the fluid near the suction port to drop and air to suck into the fluid when the power steering system is cold and the fluid is at a low level in the tank. This air can cause system noise and system fill level accuracy error. Accordingly, it has been discovered that to further reduce the volatility in the power steering tank an improved power steering baffle is necessary.

In view of the state of the known technology, one aspect of the present disclosure is to provide a power steering tank baffle comprising a filter member, a hood member and a rib member. The filter member includes an inflow portion and an outflow portion, the inflow portion including a first plurality of openings and a second plurality of openings. The hood member is disposed over the inflow portion. The rib member connects the filter member and the hood member, the rib member being disposed on the inflow portion so as to separate the first plurality of openings and the second plurality of openings.

Another aspect of the present disclosure is to provide a power steering tank baffle comprising a filter member, a hood member and a rib member. The filter member includes an inflow portion and an outflow portion, the inflow portion including a first plurality of openings and a second plurality of openings. The hood member is disposed over the inflow portion. The rib member connects the filter member and the hood member, the rib member being configured to direct a first portion of a fluid passing through the first plurality of openings in a first direction and a second portion of the fluid passing through the second plurality of openings in a second direction, the first direction being opposite the second direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
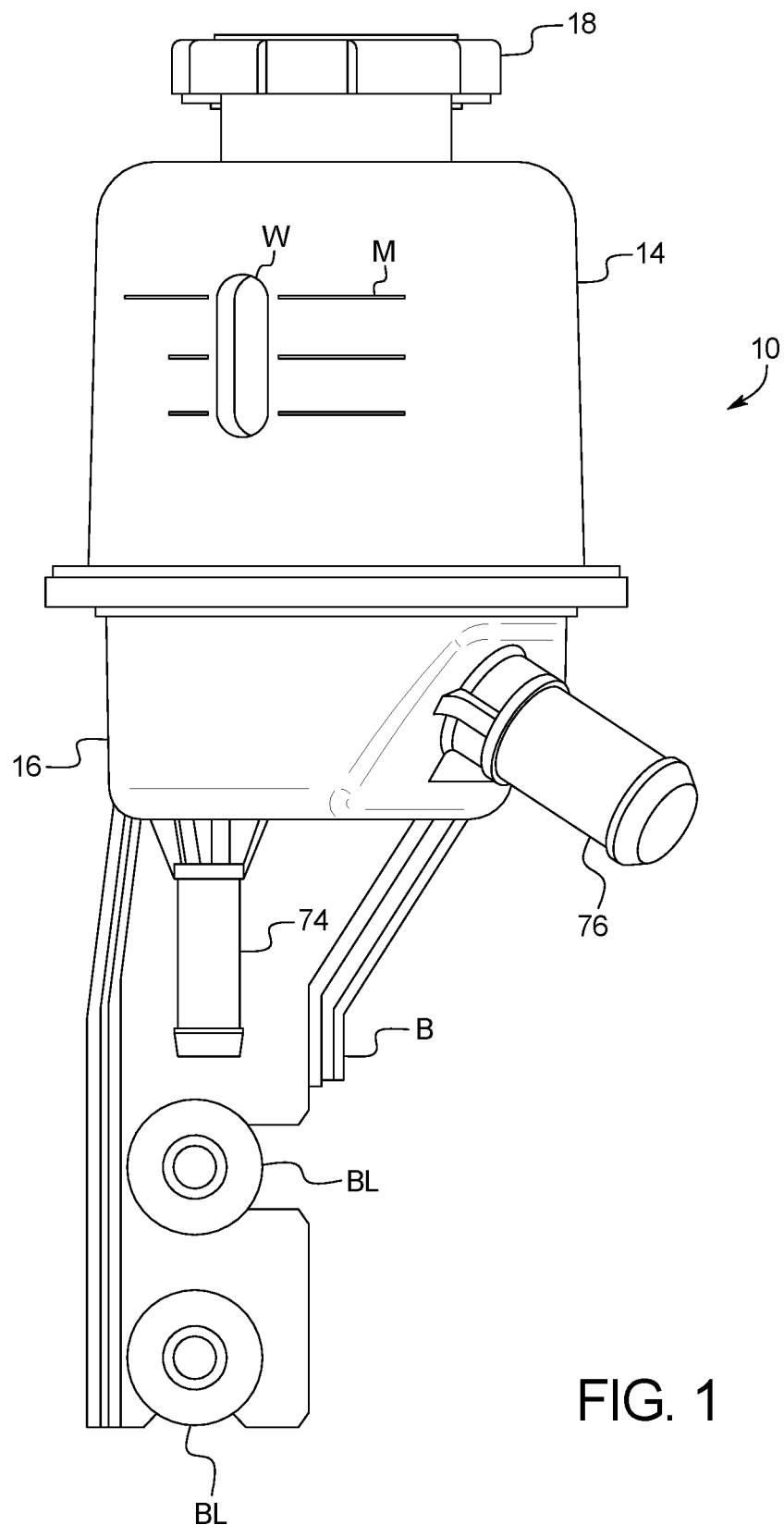
FIG. 1 is a side elevational view of a power steering tank including a baffle according to one embodiment.

Referring initially to FIGS. 1-4, a power steering tank 10 including a baffle or diffuser 12 is illustrated in accordance with a first embodiment. The power steering tank 10 is generally cylindrical and includes an upper tank portion 14, a lower tank portion 16, a cap 18 and the baffle 12. The power steering tank 10 can be attached to the interior of a vehicle engine compartment in any suitable manner. For example, as illustrated in FIG. 1, the power steering tank 10 can be attached to the interior of a vehicle engine compartment by a bracket B and steel (isolated) collars BL.

The upper tank portion 14 is preferably a plastic molded portion, but can be formed in any suitable manner with any suitable material. The upper tank portion 14 is generally cylindrical with first opening 20 at a first end 22 and a second opening 24 at a second end 26 and defines an upper interior chamber 28. The first opening 20 enables access into the upper interior chamber and is configured to receive the cap 18 in any manner desired. For example, the first opening 20 can include threads on an inner surface 30 thereof that are configured to engage threads 32 on an outer surface 34 of the cap 18. In one embodiment, the cap 18 is coupled to the upper tank portion 14 via clip mechanism 46 that engages a protrusion 48 of the first end 22 of the upper tank portion. The second end 26 of the upper tank portion 14 has a lip 36 that extends transversely to the longitudinal direction A of the power steering tank 10. That is, the lip 36 extends radially outwardly from the outer surface 38 of the upper tank portion 14. An engaging protrusion 40 extends generally perpendicularly from the lip portion 36 in the longitudinal direction A and is configured to engage with a groove 42 in the upper tank portion 16. In some embodiments, the upper tank portion 14 can include a bracket 44 to attach to an interior portion of a vehicle and a window W enabling a user to view the interior of the tank. The upper tank portion 14 can have markings M adjacent the window W to enable a user to fill the power steering tank 10 with the proper amount of fluid F. For example, as can be understand, the markings can have any suitable marks, such a "Cold Max", "Cold Min, and "Hot Max".

The lower tank portion 16 is preferably a plastic molded portion, but can be formed in any suitable manner with any suitable material. The lower tank portion 16 is generally cylindrical and with first opening 50 at a first end 52, a second opening 54 at a second 56 end and a third opening 58 in the radial outer surface 60. The lower tank portion 16 defines a lower interior chamber 62 that can be divided into a return chamber 64 and a suction chamber 66.

The first end 52 of the upper tank portion 16 has a lip portion 68 that extends transversely to the longitudinal direction A of the power steering tank 10. That is, the lip portion 68 extends radially outwardly from the outer surface 70 of the lower tank portion 16. Engaging groove 42 extends generally perpendicularly from the lip portion 68 in the longitudinal direction A and is configured to engage with a protrusion 40 in the upper tank portion 14. If desired the upper tank portion 14 and the lower tank portion 16 can be sealed together using any suitable method, and include a seal to prevent any leakage from the tank. A ledge part 72 is disposed adjacent the first opening 50 of the lower tank portion 16 and is configured to receive the baffle 12. The ledge part 72 can be disposed immediately adjacent or at the same position as the lip portion 68.

Figure 4:
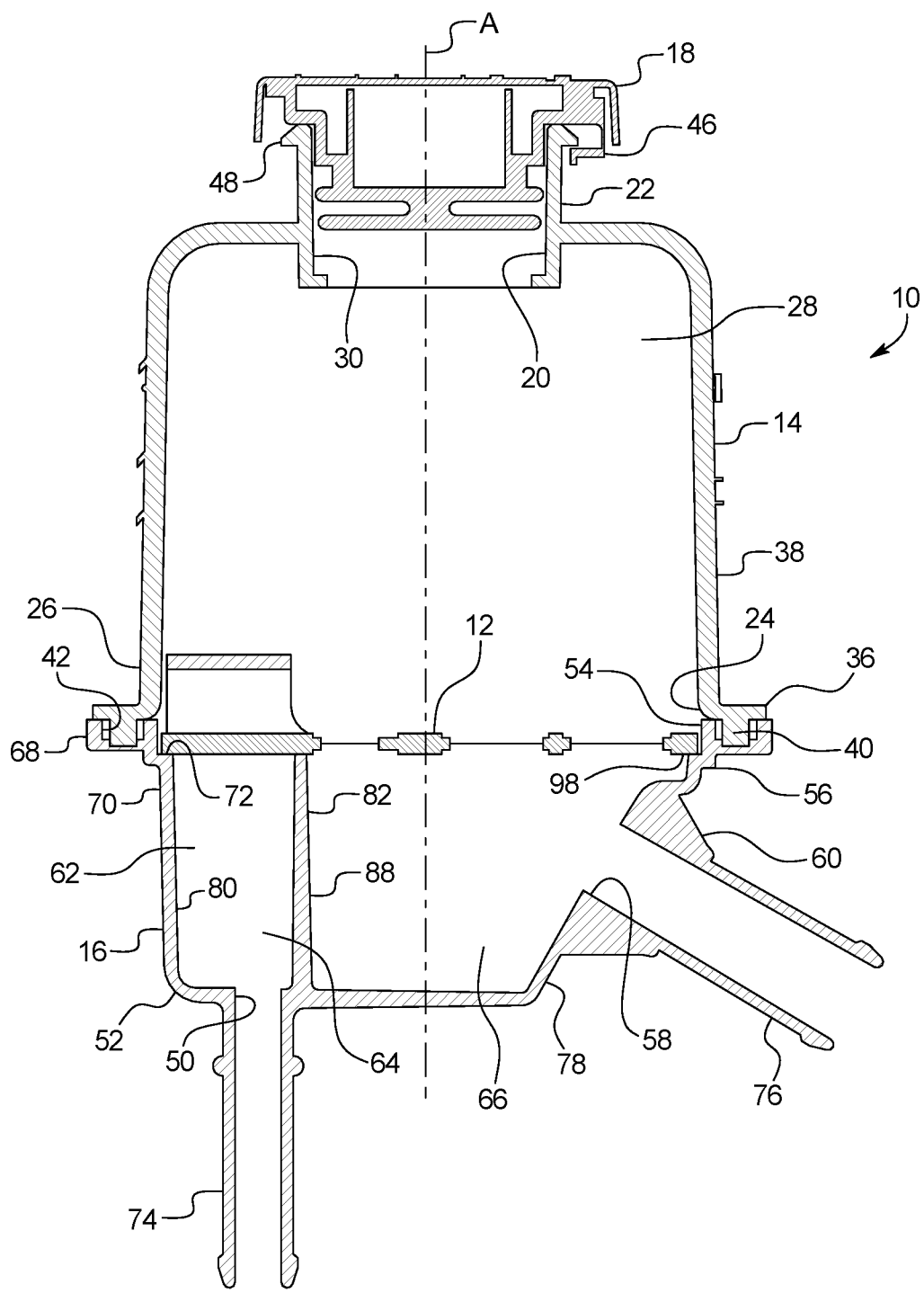
FIG. 4 is a side view in section of the power steering tank shown in FIG. 3 taken along line 4-4 of FIG. 3.

As shown in FIG. 4, the second opening 50 at the second end 52 of the lower tank portion 16 is in fluid communication with a return passage 74, to enable power steering fluid to enter the return chamber 64 in the lower chamber 62. Further, the third opening 58 is in fluid communication with a suction passage 76, to enable power steering fluid to exit the suction chamber 66 in the lower chamber 62. An angular wall 78 in the lower tank portion 16 can be disposed at the position of the second opening 58.

Figure 2:
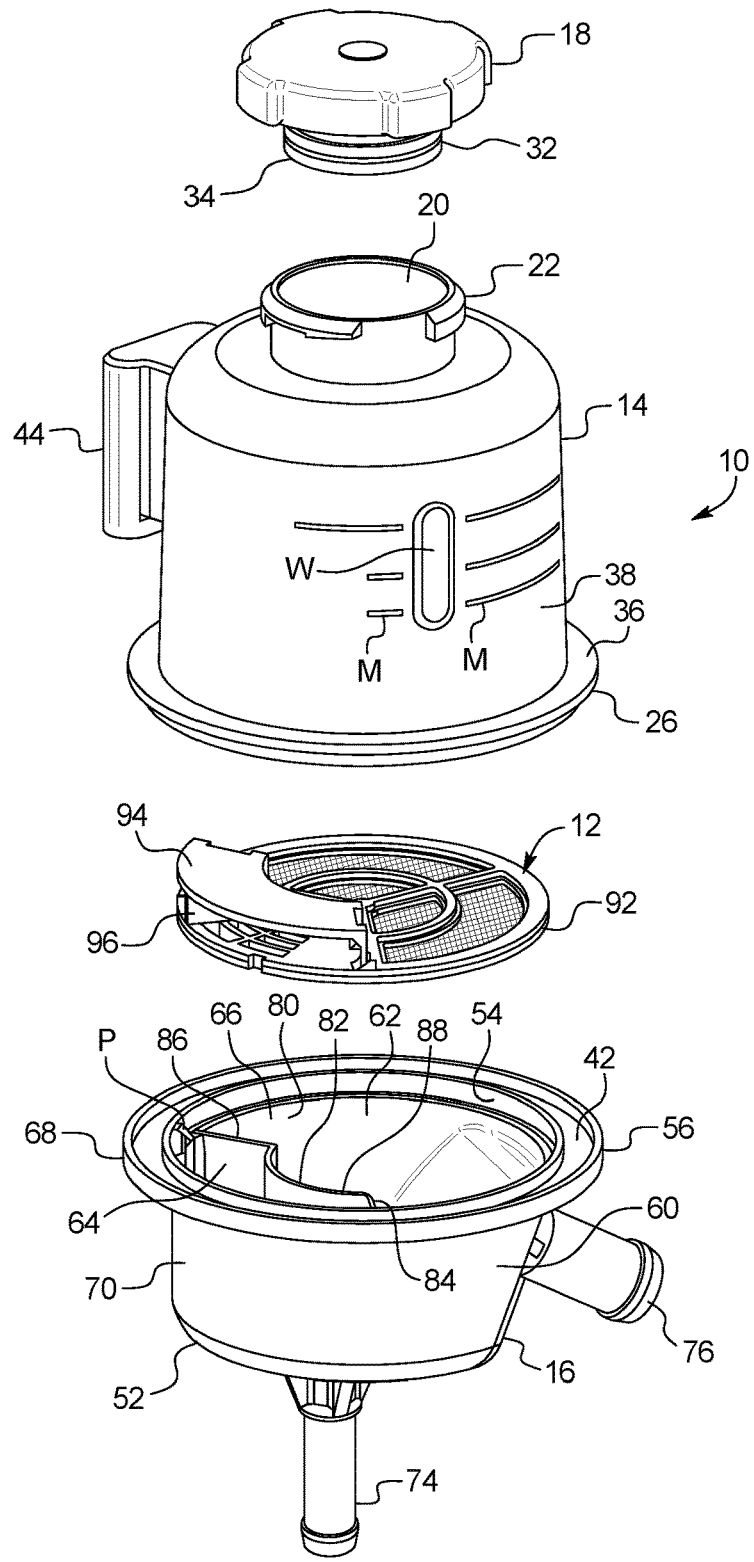
FIG. 2 is a top exploded perspective view of the power steering tank shown in FIG. 1.
Figure 3:
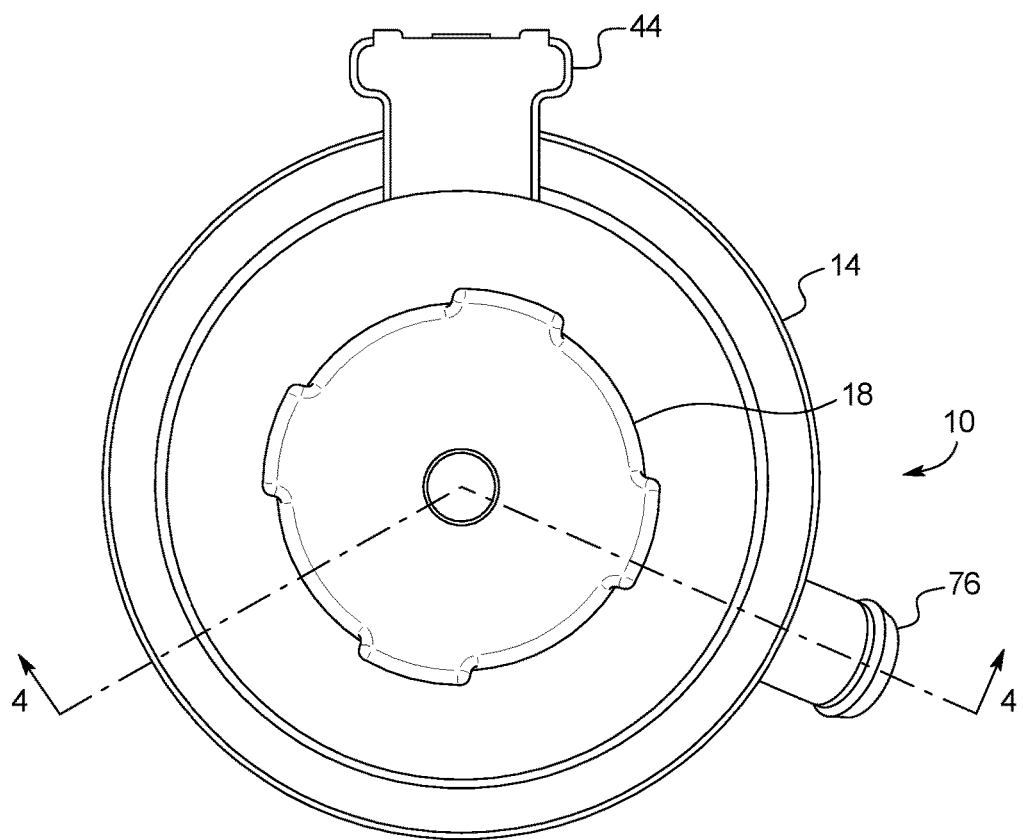
FIG. 3 is a top plan view of the power steering tank shown in FIG. 1.

As noted above, the lower chamber 62 of the lower tank portion 16 is divided into a suction chamber 66 and a return chamber 64. These chambers are formed by the inner circumferential wall 80 and a dividing wall 82. As shown in FIG. 2, the dividing wall 82 has a first radially inwardly extending member 84, a second radially inwardly extending member 86 and an inner circumferentially extending member 88 extending between and connected to the first radially inwardly extending member 84 and the second radially inwardly extending member 86. The inner circumferentially extending member 88 is generally parallel to the inner circumferential wall 80.

Turning to FIGS. 5-12, baffle 12 according to one embodiment is illustrated. The baffle 12 is preferably a plastic molded member that can be overmolded to a filter element 90. Accordingly, the baffle 12 includes a filter member 92, a hood member 94 and a rib member 96 disposed between the hood member 94 and the filter member 92. The baffle 12 can be generally circular having an outer circumference that generally has the same diameter as the inner circumferential wall 80 of the power steering tank 10 or the ledge part 72. In one embodiment, an outer circumferential portion 98 of the baffle 12 is fixed to the ledge part to secure the baffle 12 to the lower tank. The baffle 12 is preferably fixed to the ledge part 72 by plastic welding or adhesive; however, the baffle 12 can be fixed to the lower tank portion 16 (or the upper tank portion 14) in any manner desired.

Figure 5:
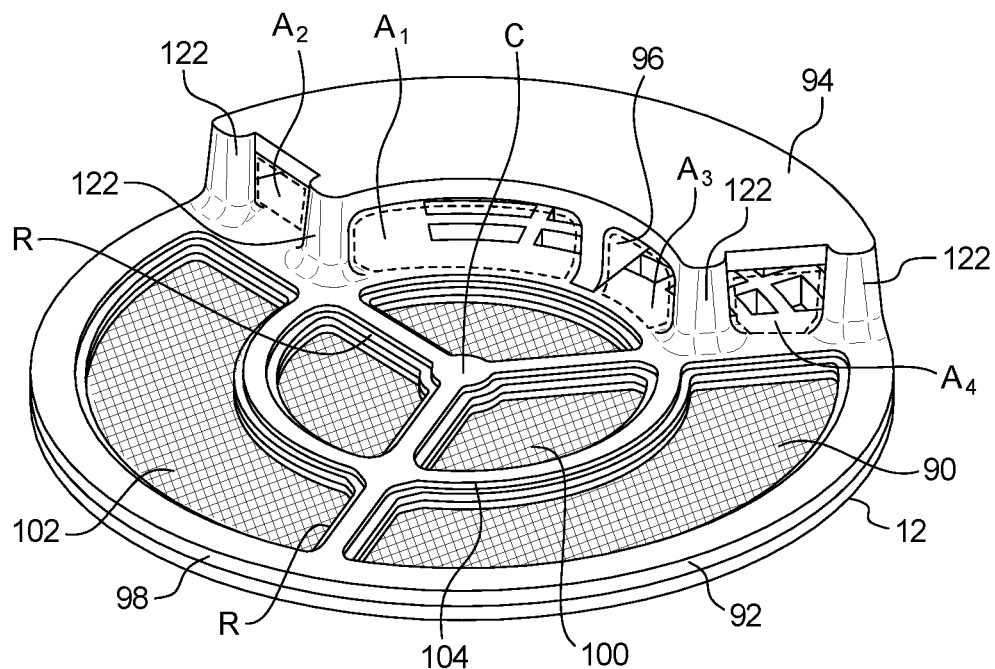
FIG. 5 is top front perspective view of the baffle shown in FIG. 2.
Figure 6:
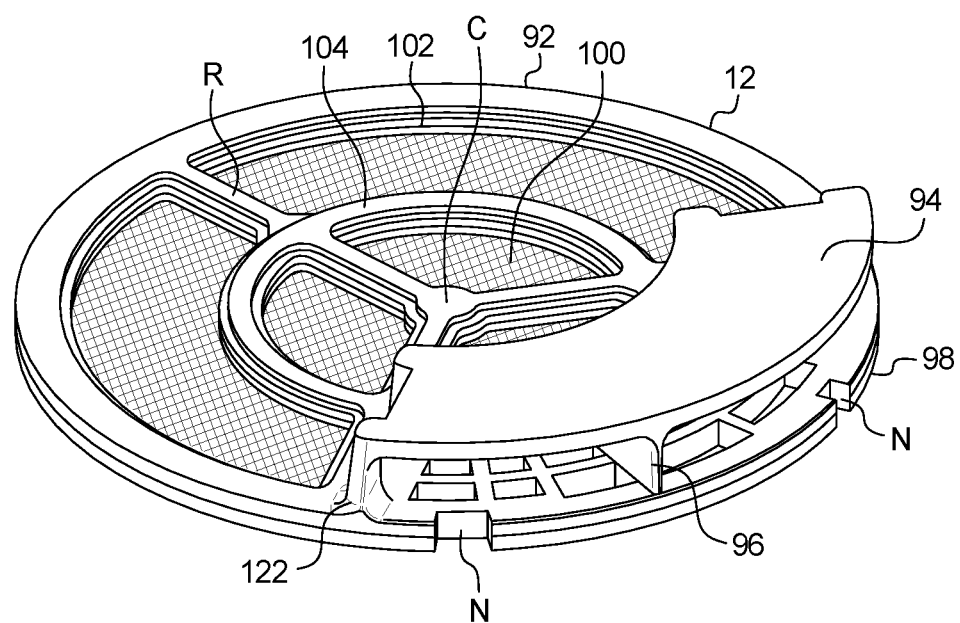
FIG. 6 is a rear top perspective view of the baffle shown in FIG. 2.
Figure 7:
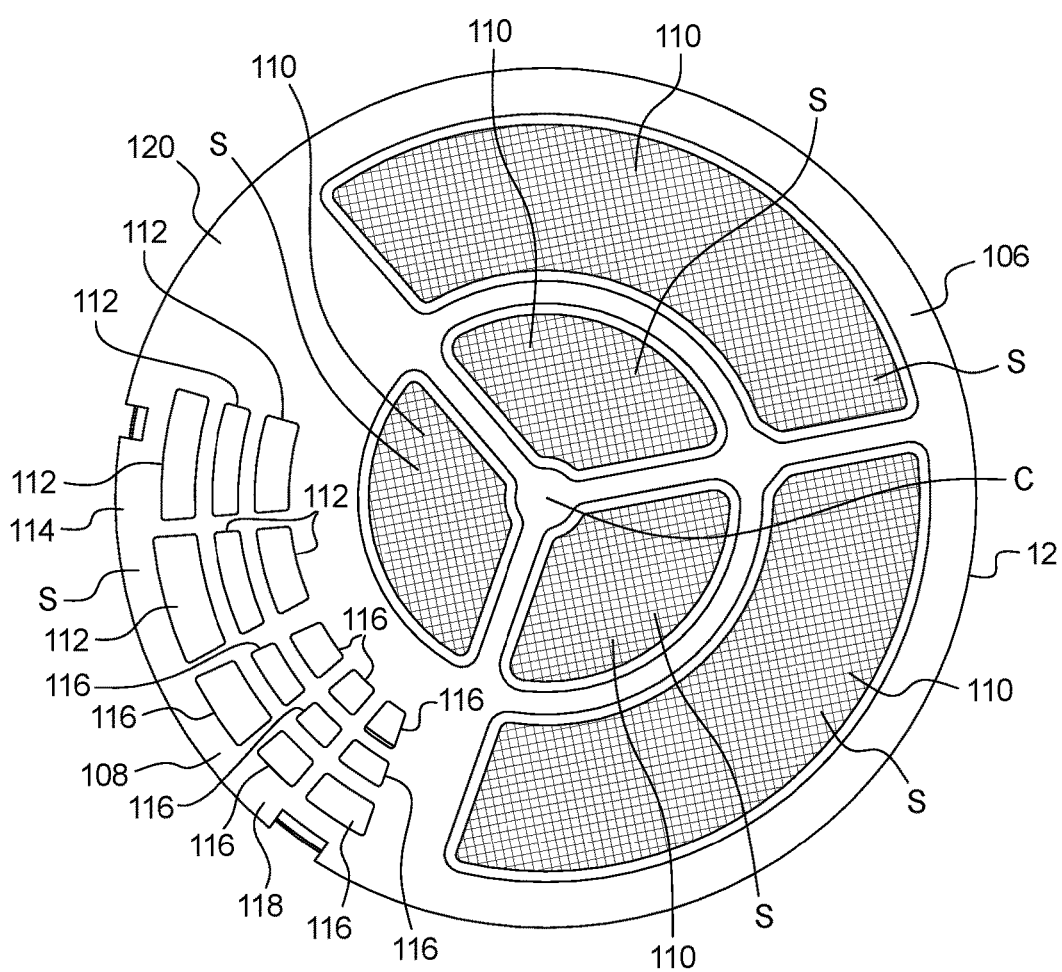
FIG. 7 is bottom plan view of the baffle shown in FIG. 2.
Figure 8:
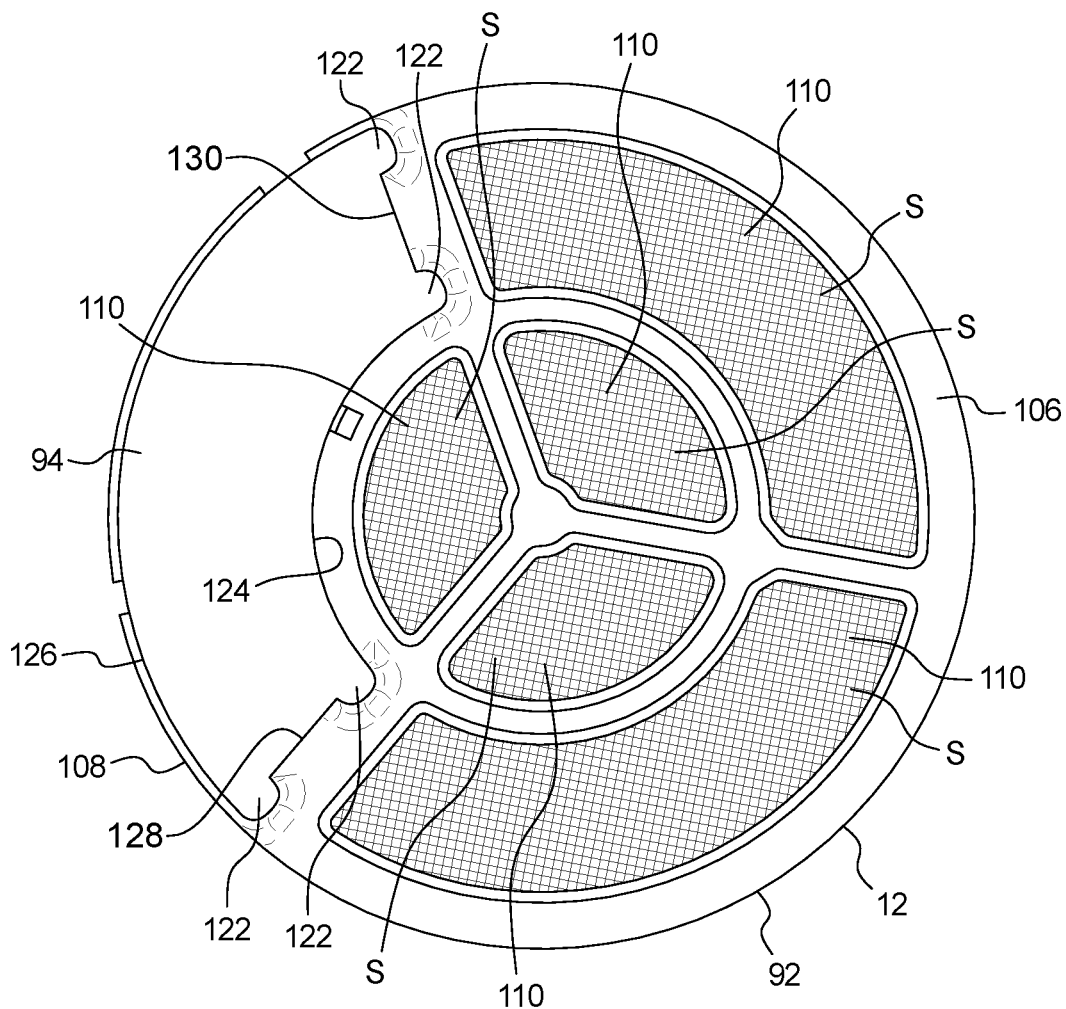
FIG. 8 is a top plan view of the baffle shown in FIG. 2.

As shown in FIGS. 5-8, the filter member includes an inner portion 100 and an outer portion 102. The inner portion 100 and the outer portion 102 are separated by an inner circumferential member 104. The inner circumferential member 104 is disposed about half way from the center C of the filter member 92 to the outer circumferential portion 98 of the baffle 12. Additionally, the filter member 92 is divided into three equal sections formed by radial members R. Thus, as can be seen in FIGS. 7 and 8, the filter member 92 is divided into six parts or sections S, three inner parts forming the inner portion 100 and three outer parts forming the outer portion 102. Each of the parts or sections is arcuate in shape.

As best seen in FIGS. 7 and 8, the filter member 92 has an outflow portion 106 and an inflow portion 108. Each of the inflow portion 108 and the outflow portion 106 is formed by sections of the inner portion 100 and/or outer portion 102 of the filter member. In particular, the outflow portion 106 is formed by three sections is from the inner portion 100 and two sections S from the outer portion 102. Each of the sections S in the outflow portion 106 has a filter element 110 disposed therein. The filter element 110 can be overmolded into the filter member 92 during the molding process to secure the filter element 110 to the filter member 92. The filter element 110 can be any desired filter element suitable for filtering power steering fluid.

The inflow portion 108 is disposed in one of the sections S of the outer portion 102. Accordingly, the outflow portion 106 has a surface area that is greater than a surface area of the inflow portion 108. The inflow portion 108 includes a first plurality of openings 112 disposed in a first area 114 and a second plurality of openings 116 in a second area 118. Each of the first and second plurality of openings 112 and 116 are generally rectangular and arcuate, and each of the first plurality of openings 112 has an area that is larger than an area of each of the second plurality of openings 116. In one embodiment, the first plurality of openings 112 includes six openings and the second plurality of openings 116 includes nine openings. Moreover, in one embodiment, the total area of the first plurality of openings 112 forms a ratio to the total area of the second plurality of openings 116 of about 1.5. That is, the total area of the first plurality of openings 112 is about 50% greater than the total area of the second plurality of openings 116. It is noted that each opening in both the first plurality of openings 112 and the second plurality of openings 116 can be configured and disposed in any suitable manner, and each of the plurality of openings 112 and 116 can have any suitable number of openings.

Adjacent the first plurality of openings 112 is a solid area 120 of the filter member 92 that is configured and arranged to block and redirect a fluid inflow of power steering fluid. The solid area 120 can be disposed and arranged in any suitable manner on the filter member.

The hood member 94 is disposed so as to overlie the inflow portion 108 and is preferably molded with the filter member 92. As shown in FIGS. 5-12, the hood member 94 is attached to the filter member 92 with four pillars or stanchions 122. However, it is noted that the hood member 94 can be attached to the filter member 92 in any manner desired. The hood member 94 has a generally rectangular and arcuate configuration and is congruent with the inflow portion 108. The hood member 94 has a radial inner edge 124, a radial outer edge 126 and first and second side edges 128 and 130. As shown in FIG. 11, the hood member 94 is disposed such that the radial inner edge 124 of the hood member 94 is disposed radially closer to a center of the filter member 92 than radial inner edges 132 of the first plurality of openings 112 and the second plurality of openings 116 to form an overhang $O_1$. Additionally, the side edge of the second plurality of openings is disposed a predetermined distance $D_2$ from the second side edge 130 to form an overhang $O_2$, and the side edge of the first plurality of openings is disposed a predetermined distance $D_3$ from the first side edge 128 to form an overhang $O_3$. The overhang $O_1$ is a predetermined distance $D_1$ that is preferably at least 2.8 mm, the predetermined distance $D_2$ of $O_2$ is preferably at least 2.3 mm, and the predetermined distance $D_3$ of $O_3$ is preferably at least 12.1 mm. However, each of the overhangs can be any suitable distance. For example, each of the overhangs can be between about 2.0-13 mm, depending on the hood configuration.

Figure 9:
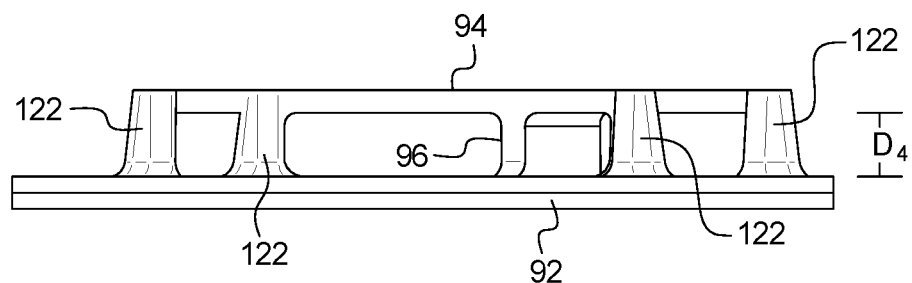
FIG. 9 is a front view of the baffle shown in FIG. 2.
Figure 10:
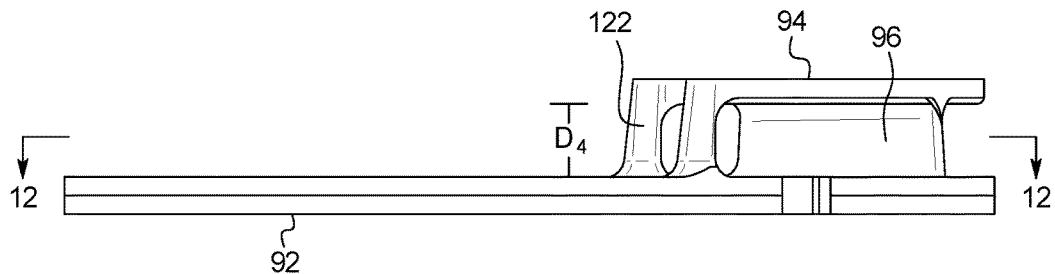
FIG. 10 is a side view of the baffle shown in FIG. 2.
Figure 11:
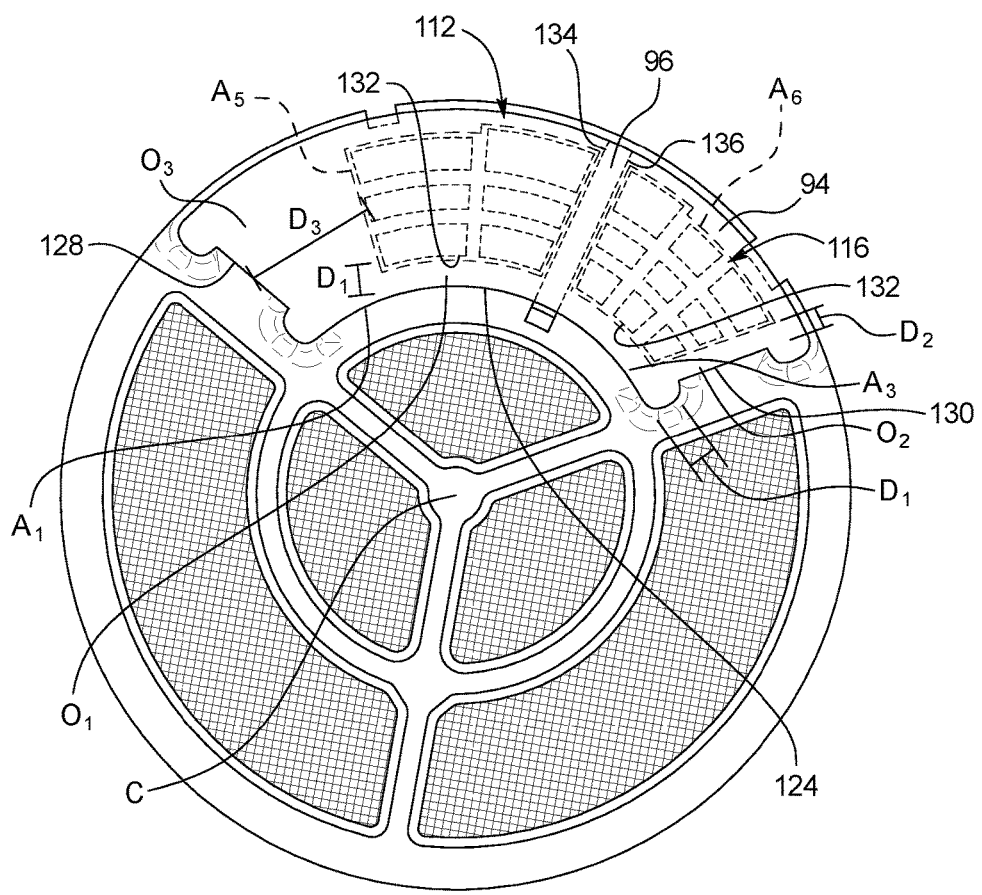
FIG. 11 is a top plan view of the baffle shown in FIG. 2 with the openings in the baffle shown in phantom.
Figure 12:
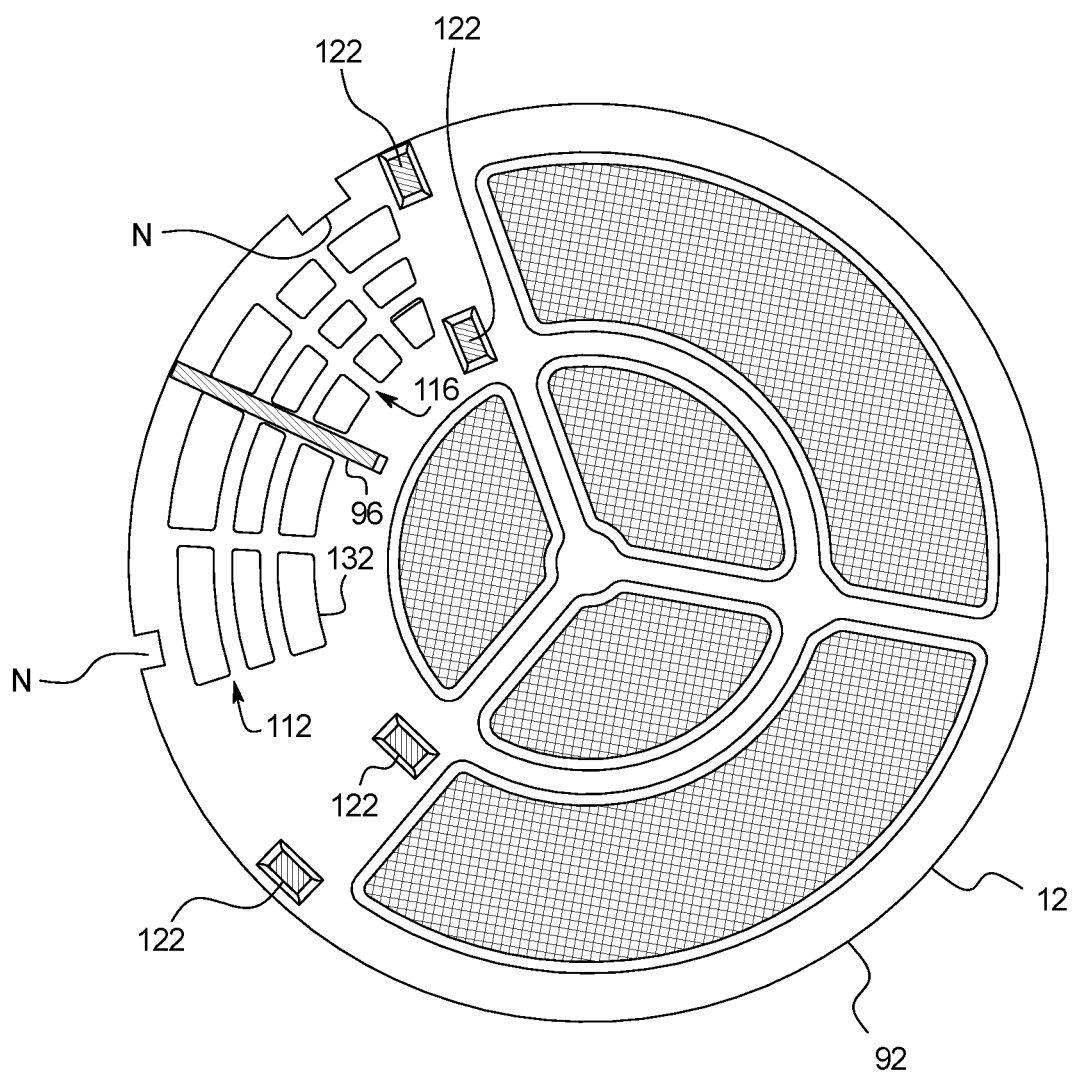
FIG. 12 is a sectional view of the baffle taken along lines 12-12 of FIG. 10.

As shown in FIGS. 9 and 10, the hood member 94 is disposed a predetermined distance $D_4$ from the filter member 92. In one embodiment, the hood member 94 is disposed about 6 mm from the filter member 92. However, it is noted that the hood member 94 can be disposed between about 4-8 mm from the filter member 92, or at any suitable distance. The radial outer edge 126 of the hood member 94 is generally adjacent to or abutting the inner circumferential surface of the upper tank portion 14. In one embodiment, a small gap is disposed between edge 126 of the hood member 94 and the inner circumferential surface of the upper tank portion 14.

As shown in FIGS. 5, 6 and 11 the rib member 96 connects the filter member 92 and the hood member 94, adding support to the four pillars 122 attaching the hood member 94 and the filter member 92 together. The rib member 96 generally extends from the inner radial edge 124 of the hood member 94 to the radial outer edge 126 of the hood member 94. The rib member 96 is disposed on the inflow portion 108 so as to separate the first plurality of openings 112 and the second plurality of openings 116. Thus, the first plurality of openings 112 is on a first side 134 of the rib member 96 and the second plurality of openings 116 is on a second side 136 of the rib member 96.

Due to the positioning of the rib member 96 between the first and second plurality of openings 112 and 116, as shown in FIGS. 5 and 11, the hood member 94, along with the rib member 96, defines a first vertical open area $A_1$ and a second vertical open area $A_2$ between the filter member 92 and the hood member 94 on the first side 134 of the rib member 96, a third vertical open area $A_3$ and a fourth vertical open area $A_4$ between the filter member 92 and the hood member 94 on the second side 136 of the rib member 96. It is noted that the first and second vertical open areas $A_1$ and $A_2$ can be a single area and the third and fourth vertical open areas $A_3$ and $A_4$ can be a single area. In other words, in one embodiment the front pillars 122 (or all pillars 122 or any combination of pillars 122) can be removed and the open areas $A_1$ and $A_2$ and $A_3$ and $A_4$ can be combined into two open areas or any number of suitable open areas.

A ratio of an area $A_5$ of the first plurality of openings 112 to an area $A_6$ of the second plurality of openings 116 is equal to a ratio of areas $A_1$ plus $A_2$ to $A_3$ plus $A_4$. The first plurality of openings 112 is disposed on the first area 114 of the filter member 92 and the second plurality of openings 116 is disposed on a second area 118 of the filter member 92, the first area 114 is configured to be disposed closer to an inlet fluid stream than the second area 118.

As shown in FIGS. 2 and 4, the baffle 12 is disposed to separate the upper interior chamber 28 from the lower interior chamber 62. Moreover, the baffle 12 is configured such that a portion of the inner circumferential member 104 and the two of the radially extending members R overlie the first radially inwardly extending member 84, the second radially inwardly extending member 86 and the inner circumferentially extending member 88 to form the return chamber 64. Moreover, the baffle 12 can have a plurality of notches N that engage respective protrusions P in the power steering tank 10 to enable proper positioning of the baffle 12 over the dividing wall 82. The hood member 94 radial outer edge 126 is configured so as to be flush against the inner circumferential surface of the power steering tank 10 to avoid fluid F from shooting up directly out of the baffle 12. This configuration directs fluid laterally to the filter element 110. However, it is noted that in one embodiment, a space or gap can be disposed between the radial outer edge 126 of the hood member 94 and the inner circumferential surface of the power steering tank 10, if desired.

Figure 13:
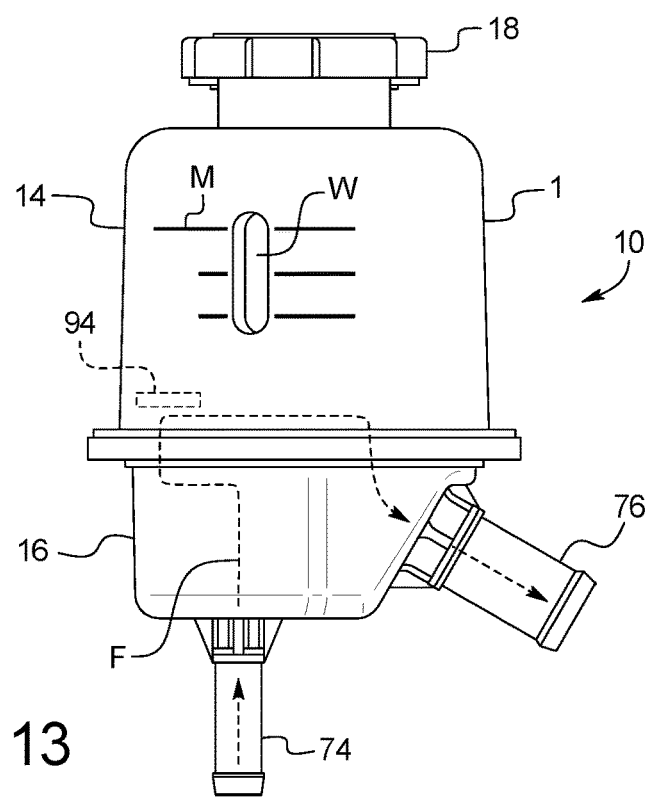
FIG. 13 is a is a side elevational view of a power steering tank of FIG. 1 with a schematic reorientation of fluid flow therethrough.
Figure 14:
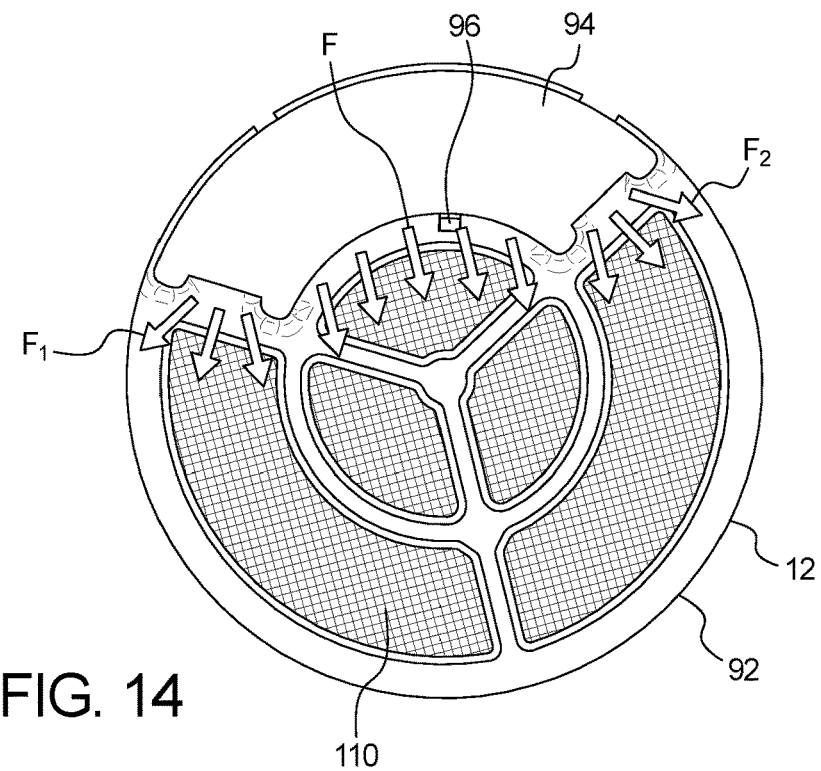
FIG. 14 is a top perspective view of the baffle of FIG. 2 with a schematic reorientation of fluid flow therethrough.

Turning to FIGS. 13 and 14, the baffle 12 is shown in operation. As is illustrated, power steering fluid F enters the return chamber 64 due to the pressure caused by the power steering pump (not shown). As the power steering fluid F enters the return chamber 64, it does so at a relatively high fluid rate. The flow rate may cause a jet or stream within the power steering tank 10. The fluid jet contacts the solid area 120 of the filter member 92 and is dispersed. Since the solid area 120 is disposed adjacent the first radially extending member 84 of the dividing wall 82, the jet is dispersed away from the first radially extending member 84, towards the first and second plurality of openings 112 and 116.

Because of the size of the area of each of the first plurality of openings 112 (i.e., larger than the size of the area of each of the second plurality of openings 116), the fluid F is influenced to enter these openings. In other words, since the fluid F is dispersed at a high flow rate, the fluid may pass the first plurality of openings 112 and attempt to pass through the second plurality of openings 116. Having the first plurality of openings 112 sized and configured in the manner discussed above, enables the flow rate between the first and second plurality of openings 112 and 116 to be generally the same. Moreover, the inflow portion 108 is configured in a rectangular radial arc pattern, as described above, preferably with 15 openings (first and second plurality of openings) to maximize surface area and keep velocity as low as possible. The radial arc hole pattern has a smaller footprint but allows more flow area than commonly used circular hole pattern diffusers.

As the fluid F traverses along the underside of the filter member 92, the fluid F passes through the first and second plurality of openings 112 and 116 and contacts the hood member 94 and the rib member 96. The rib member 96 is configured to direct a first portion $F_1$ of a fluid F passing through the first plurality of openings 112 in a first direction and a second portion $F_2$ of the fluid F passing through the second plurality of openings 116 in a second direction, the first direction being different from, and in some instances opposite to, the second direction. See for example, FIG. 14.

Accordingly, the fluid F travels in a radial direction (that is, generally transverse the longitudinal direction of the power steering fluid tank) and exits the area between the filter member 92 and the hood member 94. Since the hood member 94 is disposed such that the radial inner edge 124 of the hood member 94 is disposed radially closer to a center C of the filter member 92 than radial inner edges 132 of the first plurality of openings 112 and the second plurality of openings 116 defining the overhang $O_1$, skin friction is added. Moreover, skin friction is added by overhangs $O_2$ and $O_3$. The overhangs $O_1$, $O_2$ and $O_3$ prevent the fluid F from leaving the hood member 94 vertically, and increases the lateral movement of the fluid F.

As can be understood, the configuration of the embodiments described herein enable fluid to be initially streamlined clockwise when viewed from the top of the power steering fluid tank 10 in the return chamber 64. To get the fluid to disperse evenly both clockwise and counterclockwise and fan evenly out into the upper chamber 28, a lower resistance larger area with six radial arc holes ($A_5$) is placed closer to the fluid jet, i.e., the first plurality of openings 112. The higher resistance smaller area with nine radial arc holes ($A_6$) are placed further away from the jet, i.e., the second plurality of openings 116. As described above, area is $A_5$ is ~50% larger in area than $A_6$.

Directly above the $A_5$ and $A_6$ areas, the fluid F flows up under the hood member 94 and is split with rib member 96 into two fluid flow portions that are adjacent or overlie the two areas of the hood member 94, first area 114 and second area 118. The rib member 96 directs fluid F away from the clockwise streaming jet to evenly disperse the fluid out of the four hood openings $A_1, A_2, A_3,$ and $A_4$ into the fluid head in the upper tank 28 which continues to slow and calm the fluid. This even fanning of fluid avoids creating vortexes in the upper tank 28 which can allow air to enter the power steering fluid.

As discussed above, the inflow area ratio is approximately equal to hood split flow ratio, i.e., $A_5/A_6 \approx (A_1+A_2)/(A_3+A_4)$; keeping these ratios approximately equal enables the fluid flow moving evenly and steadily through the filter member 92 and avoids velocity increases in the fluid.

The hood member 94 in one embodiment has a top area of 9.7 cm$^2$, only about 21% relative to the total cross sectional area of the inside of the upper tank (e.g., 46.8 cm$^2$). This structure enables the use of a filter element 110 (e.g., a mesh screen filter with an area of 20.1 cm$^2$), which provides significant area to prevent contamination from entering the power steering pump (not shown) and prevent the filter element 110 from becoming clogged.

Thus, the baffle 12 as described herein maintains fluid flow laminar and flat in the power steering tank 10 during operation for a more robust design that works with high flow power steering systems but maintains a low profile for easy packaging in the engine room. Moreover, the baffle 12 described herein improves cold start performance for start up temperatures as low as −35° C. ambient temperature, such that little or no air enters the fluid which can create system noise, and reduces or eliminates air from entering the power steering fluid or splash at the vented cap 18 during a surge pressure condition.

The baffle 12 described herein can operate effectively with high fluid flow (12±0.5 L/min (liters per minute)), and a very low fluid head, increasing the tank's robustness margin for trouble free (no air entry) if not initially filled up to proper level. Moreover, the baffle 12 is capable of saving engine room packaging space, requires less oil fill, and maintain a large filter element area (e.g., 20.1 cm$^2$ in one embodiment) so as to catch contamination and avoid becoming clogged.

Figure 15:
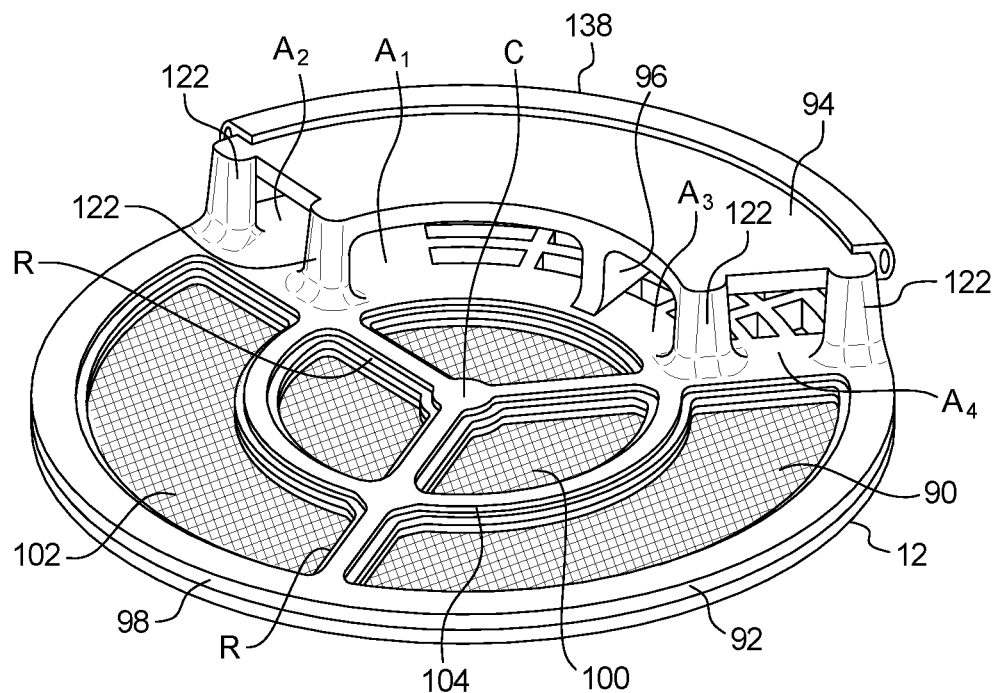
FIG. 15 is a top perspective view of another embodiment of a baffle.
Figure 16:
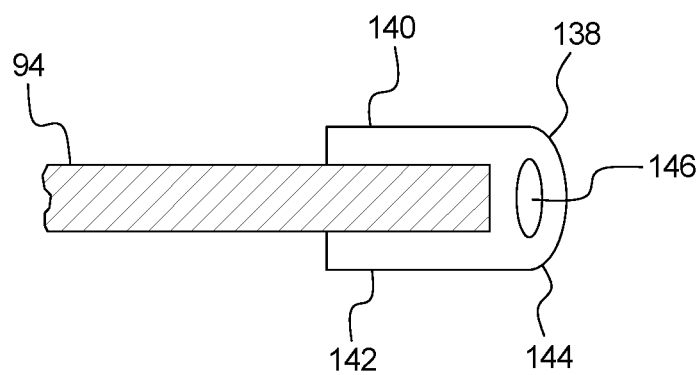
FIG. 16 is an side view of a seal on the baffle.

In another embodiment, as shown in FIGS. 15 and 16, a flexible seal 138 can be disposed between edge 126 of the hood member 94 and the inner circumferential surface of the upper tank portion 14 so as to prevent fluid from passing therebetween. In this embodiment, the seal can be made from any suitable material, such as rubber. As shown in FIG. 16, the seal 138 can have a U-shaped configuration, such that a top portion 140 of the seal 138 overlaps a top portion of the hood 94 and a bottom portion 142 of the seal 138 overlaps a bottom portion of the hood 94. The top portion 140 and the bottom portion 142 are connected by an outer portion 144. The outer portion 144 of the seal 138 can have a hollow portion 146 to enable additional flexibility in the outer portion 144.

The power steering system and pump are conventional components that are well known in the art. Since the power steering system and pump are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "above", "vertical", and "transverse" as well as any other similar directional terms refer to those directions of a vehicle equipped with the power steering tank baffle. Accordingly, these terms, as utilized to describe the present invention should be interpreted relative to a vehicle equipped with the power steering tank baffle.

The term "configured" as used herein to describe a component, section or part of a device includes hardware and/or software that is constructed and/or programmed to carry out the desired function.

The terms of degree such as, "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A power steering tank baffle, comprising:
a filter member including an inflow portion and an outflow portion, the inflow portion including a first plurality of openings having a first flow path and a second plurality of openings;
a hood member disposed over the inflow portion to cover the first or second plurality of openings and defining an open area having a second flow path transverse to the first flow path; and
a rib member connecting the filter member and the hood member, the rib member extending along the inflow portion adjacent at least two openings of the first plurality of openings and separating the first plurality of openings and the second plurality of openings,
the first plurality of openings and the hood member being disposed such that power steering fluid is capable of passing through the first plurality of openings along the first flow path, and then contact the hood member so as to be directed through the open area along the second flow path.

2. The power steering tank baffle of claim 1, wherein the outflow portion has a surface area that is greater than a surface area of the inflow portion.

3. The power steering tank baffle of claim 1, wherein the rib member is configured to direct a first portion of a fluid passing through the first plurality of openings in a first direction along at least a portion of the second flow path and a second portion of the fluid passing through the second plurality of openings in a second direction, the first direction being different from the second direction.

4. The power steering tank baffle of claim 1, wherein the hood member is disposed such that a radial inner edge of the hood member is disposed radially closer to a center of the filter member than radial inner edges of the first plurality of openings and the second plurality of openings.

5. The power steering tank baffle of claim 1, wherein the hood member is disposed about 6 mm from the filter member.

6. The power steering tank baffle of claim 1, wherein the filter member is configured to be disposed within a power steering tank such that when a fluid enters the power steering tank, the fluid contacts an underside of the filter member adjacent the first plurality of openings.

7. The power steering tank baffle of claim 1, wherein each of the first and second plurality of openings are arcuate, and each of the first plurality of openings has an area that is larger than an area of each of the second plurality of openings.

8. The power steering tank baffle of claim 7, wherein the first plurality of openings being on a first side of the rib member and the second plurality of openings being on a second side of the rib member, and the hood member defines the open area so as to be a first vertical open area between the filter member and the hood member on the first side of the rib member and a second vertical open area between the filter member and the hood member on the second side of the rib member.

9. The power steering tank baffle of claim 8, wherein a ratio of an area of the first plurality of openings to an area of the second plurality of openings is equal to a ratio of an area of the first vertical open area between the filter member and the hood member on the first side of the rib member to an area of the second vertical open area between the filter member and the hood member on the second side of the rib member.

10. The power steering tank baffle of claim 1, wherein the first plurality of openings are disposed on a first area of the filter member and the second plurality of openings are disposed on a second area of the filter member, the first area is configured to be disposed closer to an inlet fluid stream than the second area.

11. The power steering tank baffle of claim 1, wherein the hood member is configured to change a direction of a fluid entering a power steering tank.

12. A power steering tank baffle, comprising:
a filter member including an inflow portion and an outflow portion, the inflow portion including a first plurality of openings having a first flow path and a second plurality of openings;
a hood member disposed over the inflow portion to cover the first or second plurality of openings; and
a rib member connecting the filter member and the hood member and extending along the inflow portion adjacent at least two openings of the second plurality of openings and separating the first plurality of openings and the second plurality of openings, the rib member being configured to direct a first portion of a fluid passing through the first plurality of openings in a first direction and a second portion of the fluid passing through the second plurality of openings in a second direction, the first direction being opposite the second direction,
the first plurality of openings and the hood member being disposed such that power steering fluid is capable of passing through the first plurality of openings along the first flow path, and then contact the hood member so as to be directed through an open area along a second flow path at least in the first direction, the second flow path being transverse to the first flow path.

13. The power steering tank baffle of claim 12, wherein the rib member is disposed on the inflow portion so as to separate the first plurality of openings and the second plurality of openings.

14. The power steering tank baffle of claim 12, wherein the outflow portion has a surface area that is greater than a surface area of the inflow portion.

15. The power steering tank baffle of claim 12, wherein the hood member is disposed such that a radial inner edge of the hood member is disposed radially closer to a center of the filter member than radial inner edges of the first plurality of openings and the second plurality of openings.

16. The power steering tank baffle of claim 12, wherein the filter member is configured to be disposed within a power steering tank such that when a fluid enters the power steering tank, the fluid contacts an underside of the filter member adjacent the first plurality of openings.

17. The power steering tank baffle of claim 12, wherein each of the first and second plurality of openings are arcuate, and each of the first plurality of openings has an area that is larger than an area of each of the second plurality of openings.

18. The power steering tank baffle of claim 17, wherein the first plurality of openings being on a first side of the rib member and the second plurality of openings being on a second side of the rib member, and the hood member defines the open area as a first vertical open area between the filter member and the hood member on the first side of the rib member and a second vertical open area between the filter member and the hood member on the second side of the rib member.

19. The power steering tank baffle of claim 18, wherein a ratio of an area of the first plurality of openings to an area of the second plurality of openings is equal to a ratio of an area of the first vertical open area between the filter member and the hood member on the first side of the rib member to an area of the second vertical open area between the filter member and the hood member on the second side of the rib member.

20. The power steering tank baffle of claim 12, wherein the first plurality of openings are disposed on a first area of the filter member and the second plurality of openings are disposed on a second area of the filter member, the first area is configured to be disposed closer to an inlet fluid stream than the second area.

21. The power steering tank baffle of claim 1, wherein the inflow portion is offset from a central axis of the power steering tank baffle.

22. A power steering tank baffle, comprising:
a filter member including an inflow portion and an outflow portion, the inflow portion including a first plurality of openings having a first flow path and a second plurality of openings;
a hood member disposed over the inflow portion to define an open area having a second flow path transverse to the first flow path; and
a rib member connecting the filter member and the hood member, the rib member being disposed on the inflow portion so as to separate the first plurality of openings and the second plurality of openings,
the first plurality of openings and the hood member being disposed such that power steering fluid is capable of passing through the first plurality of openings along the first flow path, and then contact the hood member so as to be directed through the open area along the second flow path.

* * * * *